United States Patent [19]

Kojima et al.

[11] Patent Number: 5,388,812
[45] Date of Patent: Feb. 14, 1995

[54] LIQUID-SEALED TYPE VIBRATION ISOLATOR

[75] Inventors: Hiroshi Kojima, Yokohama; Kazuya Takano, Kamakura, both of Japan

[73] Assignee: Bridgestone Corporation, Tokyo, Japan

[21] Appl. No.: 53,696

[22] Filed: Apr. 29, 1993

[30] Foreign Application Priority Data

May 8, 1992 [JP] Japan .................. 4-116377

[51] Int. Cl.⁶ .............................................. F16F 9/10
[52] U.S. Cl. ............................ 267/140.14; 267/140.13
[58] Field of Search ........... 267/64.27, 140.11–140.14, 267/141.6; 248/562, 563, 566, 636

[56] References Cited

U.S. PATENT DOCUMENTS

| | | | |
|---|---|---|---|
| 4,650,170 | 3/1987 | Fukushima | 248/562 X |
| 4,742,998 | 5/1988 | Schubert | 267/140.14 X |
| 4,793,600 | 12/1988 | Kojima | 248/636 X |
| 4,869,474 | 9/1989 | Best et al. | 248/636 X |
| 4,919,402 | 4/1990 | Doi | 248/562 X |
| 5,042,786 | 8/1991 | Freudenberg et al. | 267/140.14 |

FOREIGN PATENT DOCUMENTS

| | | | |
|---|---|---|---|
| 0155028 | 8/1985 | Japan | 267/140.14 |
| 61-2939 | 1/1986 | Japan | . |
| 2300538 | 12/1990 | Japan | 267/140.12 |
| 3-24338 | 2/1991 | Japan | . |
| 4025634 | 1/1992 | Japan | 267/140.14 |
| 4131538 | 5/1992 | Japan | 267/140.14 |

Primary Examiner—Robert J. Oberleitner
Assistant Examiner—Alfred Muratori
Attorney, Agent, or Firm—Oliff & Berridge

[57] ABSTRACT

A liquid-sealed type vibration isolator has a resilient member disposed between the a mounting member, connected to one of a vibration-generating portion and a vibration-receiving portion, and a second mounting member, connected to the other one of the vibrator-generating portion and the vibrator-receiving portion, and the resilient member is adapted to undergo deformation during occurrence of vibrations. A pressure-receiving liquid chamber is disposed in such a manner as to be capable of expanding and shrinking by using the resilient member as a portion of a partition wall thereof. A limiting passageway allows the pressure-receiving liquid chamber and the auxiliary liquid chamber to communicate with each other. A vibrating element is supported by one of the first mounting member and the second mounting member via a resilient supporting member in such a manner as to be movable along a predetermined axis, and the vibrating element constitutes a portion of another partition wall of the pressure-receiving liquid chamber so as to be subjected to the hydraulic pressure of the pressure-receiving liquid chamber. A solenoid has a coil and a plunger adapted to move the vibrating element in one of two predetermined directions along the axis. A spring urges the vibrating element in the other one of the two predetermined directions.

20 Claims, 6 Drawing Sheets

LIQUID-SEALED TYPE VIBRATION ISOLATOR

BACKGROUND OF THE INVENTION

1. Field of the Invention

The present invention relates to a liquid-sealed type vibration isolator for use in a vehicle, a general industrial machine or the like and adapted to absorb and attenuate vibrations from a vibration-generating portion thereof.

2. Description of the Related Art

In an automobile engine, a vibration isolator serving as an engine mount is interposed between the engine and the chassis, so as to prevent the vibrations of the engine from being imparted to the chassis.

As a vibration isolator of this type, a liquid-sealed type vibration isolator has been proposed in which a portion of a partition wall of a pressure-receiving liquid chamber (a main liquid chamber) is formed by a diaphragm, and the diaphragm is vibrated when a limiting passageway allowing the main liquid chamber and an auxiliary liquid chamber to communicate with each other is clogged so as to suppress a change in the pressure within the liquid chambers, thereby making it possible to control an increase in the dynamic spring constant.

The diaphragm of this liquid-sealed type vibration isolator is formed of an iron plate or the like, and its periphery is supported by membrane-type rubber onto a member constituting the main liquid chamber. An electromagnet for attracting the diaphragm is disposed on the side of the diaphragm which is the side away from the main liquid chamber.

In this liquid-sealed type vibration isolator, during the occurrence of vibrations with low frequencies and relatively large amplitude, such as idling vibrations, a liquid flows between the main liquid chamber and the auxiliary liquid chamber via the limiting passageway, so that a large attenuating force is produced, thereby absorbing the vibrations with low frequencies and relatively large amplitude such as idling vibrations.

On the other hand, when the frequencies of the vibrations become high and the limiting passageway is consequently clogged, the magnetic force of the electromagnet is increased or decreased to vibrate the diaphragm in the direction in which the change in the pressure within the main liquid chamber is suppressed, thereby making it possible to control an increase in the dynamic spring constant.

In the combination of the electromagnet and the diaphragm formed of an iron plate or the like, the iron plate is moved by the attracting force of the electromagnet when the iron plate moves toward the electromagnet. On the other hand, the iron plate is moved by the restoring force of the membrane-type rubber supporting the diaphragm when the iron plate moves in a direction away from the electromagnet.

When the diaphragm is moved toward the electromagnet, the attracting force can be controlled by controlling the magnetic force of the electromagnet. However, since the movement of the diaphragm in the direction away from the electromagnet is based on the restoring force of the membrane-type rubber, the force is weak and is not efficient. For this reason, when the frequencies of the vibrations become high, the movement of the diaphragm in the direction away from the electromagnet cannot follow the inputted vibrations, so that the vibration-absorbing efficiency declines.

In addition, the change of the rubber supporting the diaphragm with the lapse of time is unavoidable, and there is a possibility that the restoring force necessary for moving the diaphragm gradually declines, resulting in the deterioration of the characteristics.

SUMMARY OF THE INVENTION

Accordingly, it is an object of the present invention to provide a liquid-sealed vibration isolator capable of efficiently vibrating a diaphragm and reliably absorbing high-frequency vibrations, thereby overcoming the above-described drawbacks of the conventional art.

To this end, in accordance with a first aspect of the present invention, there is provided a liquid-sealed type vibration isolator comprising: a first mounting member connected to one of a vibration-generating portion and a vibration-receiving portion; a second mounting member connected to the other one of the vibration-generating portion and the vibration-receiving portion; a resilient member disposed between the first mounting member and the second mounting member and adapted to undergo deformation during occurrence of vibrations; a pressure-receiving liquid chamber disposed in such a manner as to be capable of expanding and contracting by using the resilient member as a portion of a partition wall of the pressure-receiving liquid chamber; an auxiliary liquid chamber disposed in spaced-apart relation with the pressure-receiving chamber; a limiting passageway allowing the pressure-receiving liquid chamber and the auxiliary liquid chamber to communicate with each other; a vibrating element supported by one of the first mounting member and the second mounting member via a resiliently supporting member in such a manner as to be movable along a predetermined direction, the vibrating element constituting a portion of another partition wall of the pressure-receiving liquid chamber so as to be subjected to the hydraulic pressure of the pressure-receiving liquid chamber; electromagnetically driving means for moving the vibrating element in one of two predetermined directions, the electromagnetically driving means having magnetic-field generating means for generating a magnetic field and a movable member adapted to be moved in that one of the two predetermined directions by being subjected to the magnetic field generated by the magnetic-field generating means; and urging means for urging the vibrating element in the other one of the two predetermined directions.

In the liquid-sealed type vibration isolator in accordance with a second aspect of the present invention, the electromagnetically driving means is a solenoid, the movable member is a plunger, and the magnetic-field generating means is a coil.

In accordance with the first aspect of the present invention, if the first mounting member is connected to a vibration-generating portion such as an engine, and the second mounting member is connected to a vibration-receiving portion such as the chassis of an automobile, the vibrations of the engine or the like are supported by the vibration-receiving portion such as the chassis via the first mounting member, the resilient member, and the second mounting member. When the vibrations of the engine or the like are transmitted to the liquid-sealed type vibration isolator, the resilient member is deformed and a pressure change takes place within the pressure-receiving liquid chamber. Owing to this pressure change, the internal liquid passes back and forth between the pressure-receiving liquid chamber and the auxiliary liquid chamber via the limiting passageway, so that a large attenuating force is produced in the liquid-sealed vibration isolator, thereby allowing the vibrations to be effectively absorbed.

In addition, when the frequency of the vibrations has become high and the limiting passageway is consequently clogged, the magnetic-field generating means is actuated to move the movable member in one of the two predetermined directions. Subsequently, the magnetic force is reduced or set to zero, and the movable member is moved in the other one of the two predetermined directions by the urging force of the urging means. Thus, the vibrating element is reciprocated along the predetermined directions, i.e., is vibrated, so as to be vibrated in the direction in which the change in the internal pressure of the pressure-receiving liquid chamber is offset, thereby controlling a rise in the dynamic spring constant during the occurrence of high-frequency vibrations.

In addition, in accordance with the second aspect of the present invention, the electromagnetically driving means is a solenoid, and a magnetic field is produced as current flows across the coil, so that the plunger is moved, thereby moving the vibrating element.

As described above, since the liquid-sealed vibration isolator is arranged as described above, outstanding advantages are obtained in that the vibrating element is vibrated efficiently, and that the high-frequency vibrations can be absorbed reliably.

BRIEF DESCRIPTION OF THE DRAWINGS

The above and other objects, features and advantages of the invention will become more apparent from the following detailed description when read in conjunction with the accompanying drawings, in which.

DESCRIPTION OF THE PREFERRED EMBODIMENTS

Figure 1:
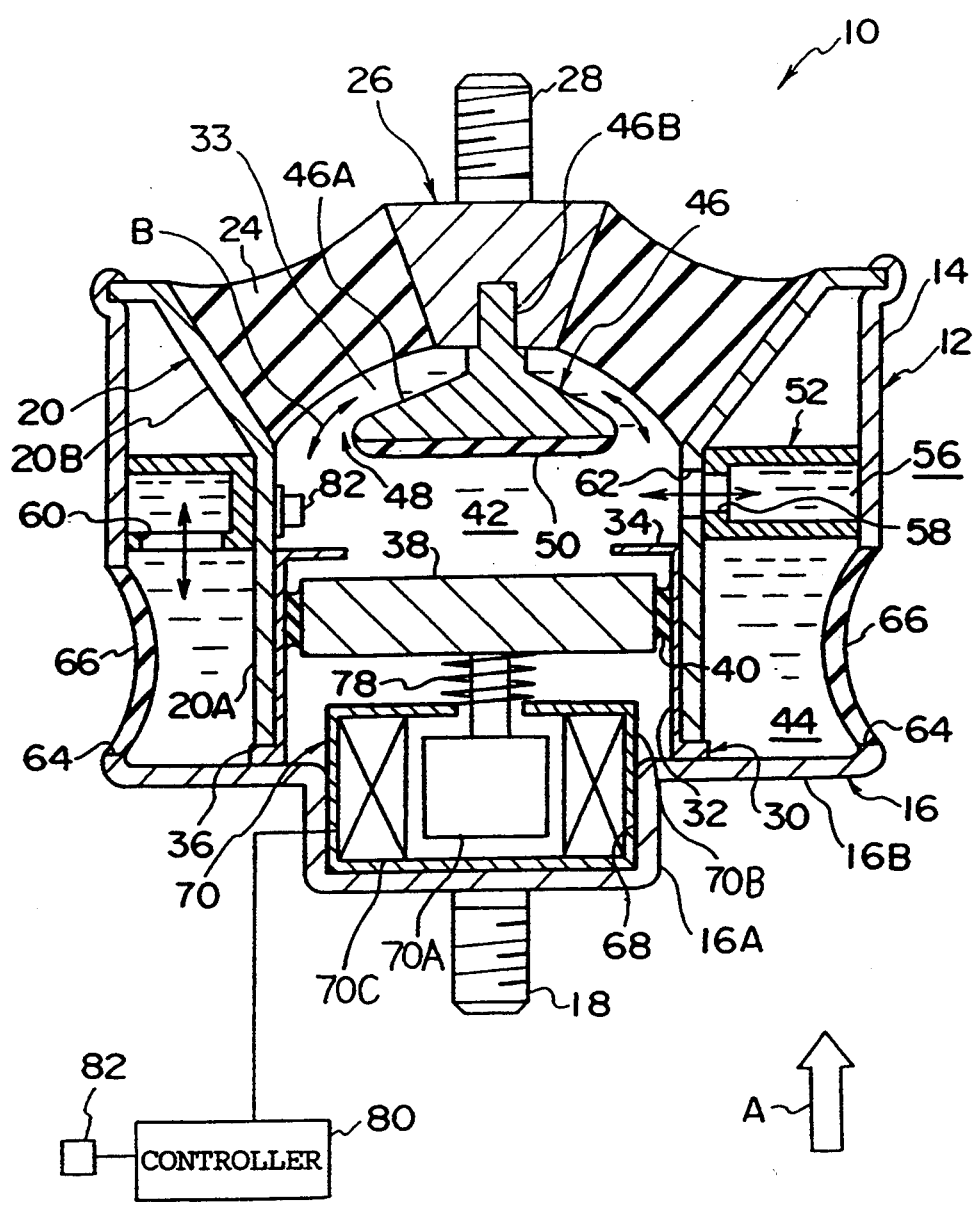
FIG. 1 is a cross-sectional view of a vibration isolator in accordance with a first embodiment of the present invention as taken along an axis thereof.
Figure 2:
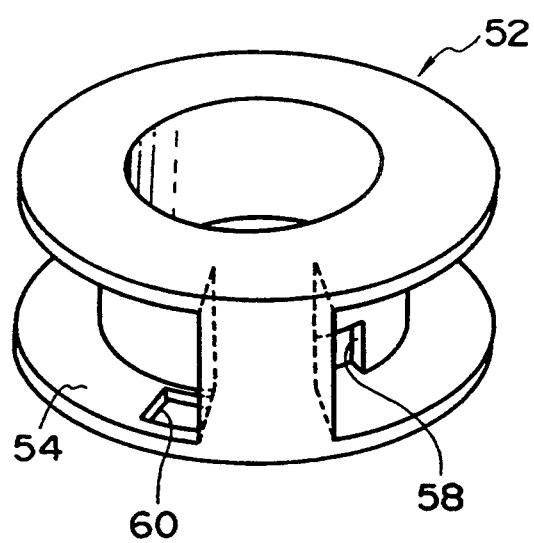
FIG. 2 is a perspective view illustrating a partition member of the vibration isolator in accordance with the first embodiment of the present invention.
Figure 2:
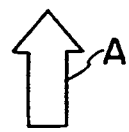
Figure 3:
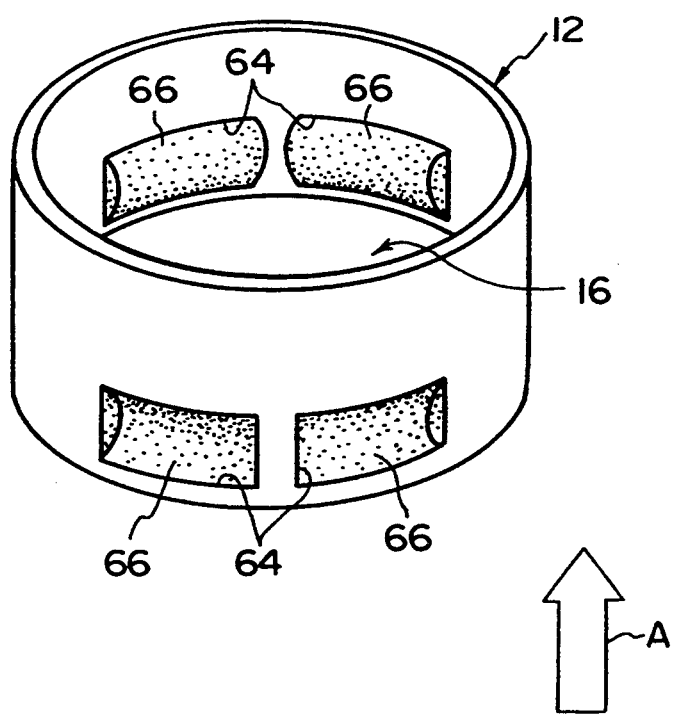
FIG. 3 is a perspective view illustrating a limiting-passageway constituting member of the vibration isolator in accordance with the first embodiment of the present invention.

Referring to FIGS. 1 to 3, a description will be given of a first embodiment of the present invention. It should be noted that in all the drawings the direction of arrow A and the opposite direction to the direction of arrow A are defined as an upward direction and a downward direction, respectively.

As shown in FIG. 1, a vibration isolator 10 of this embodiment is provided with an outer case 12 serving as a first mounting member. This outer case 12 is formed in the shape of a cup, and is comprised of a cylindrical portion 14 having a vertically extending axis and a bottom plate 16 formed in the shape of an inverted hat for closing the lower side of the cylindrical portion 14.

A mounting bolt 18 projects downward from a central portion of the outer side of the bottom plate 16, and is secured to, for example, a chassis of an unillustrated automobile.

An inner cylinder 20 is disposed inside the outer case 12 coaxially therewith. A small cylindrical portion 20A having a smaller diameter than the outer case 12 is disposed as a substantially lower half of the inner cylinder 20. The diameter of the small cylindrical portion 20A is made slightly larger than that of a cylindrical portion 16A of the bottom plate 16.

A flared portion 20B whose diameter is gradually enlarged is formed integrally on the upper side of the small cylindrical portion 20A. The outer periphery of a resilient member 24 having a large wall thickness and formed annularly is vulcanized to the inner periphery of the flared portion 20B. A support base 26 serving as a second mounting member is vulcanized to the inner periphery of the resilient member 24, and the upper side of the inner cylinder 20 is closed by the resilient member 24 and the support base 26. This support base 26 is a mounting portion for an unillustrated engine, and a mounting bolt 28 for fixing the engine is disposed uprightly on the upper surface of the support base 26.

A stopper 30 serving as an amount-of-movement restricting member is disposed on the radially inner side of the small cylindrical portion 20A. This stopper 30 is comprised of a cylindrical portion 32 which is in close contact with the inner periphery of the small cylindrical portion 20A, an annular abutment portion 34 disposed integrally on an upper end of this cylindrical portion 32, and an annular fixed portion 36 disposed integrally at a lower end of the cylindrical portion 32 and extending radially outwardly from the lower end of the cylindrical portion 32.

The fixed portion 36 of the stopper 30 is clamped and secured by the lower end of the small cylindrical portion 20A and an annular plate portion 16B of the bottom plate 16 in close contact therewith.

A disk-like diaphragm (vibrating element) 38 is disposed coaxially on the radially inner side of the stopper 30. The outer diameter of the diaphragm 38 is made smaller than the inside diameter of the cylindrical portion 32 and larger than the inside diameter of the abutment portion 34. A resilient supporting member 40 such as rubber formed annularly is disposed between the diaphragm 38 and the cylindrical portion 32, and this resilient supporting member 40 has its inner periphery adhering to the outer periphery of the diaphragm 38 and its outer periphery adhering to the inner periphery of the cylindrical portion 32. As a result, the diaphragm 38 is capable of moving in the axial direction relative to the cylindrical portion 32. It should be noted that the diaphragm 38 is spaced apart a predetermined dimension from the abutment portion 34 of the stopper 30.

The space surrounded by the diaphragm 38, the small cylindrical portion 20A, the resilient supporting member 40, the resilient member 24, and the support base 26 is formed as a pressure-receiving liquid chamber (main liquid chamber) 42, and a liquid such as ethylene glycol is filled therein.

An umbrella orifice member 46 is disposed in the center of the main liquid chamber 42. The umbrella orifice member 46 is comprised of a substantially conical main-body portion 46A tapered toward the support base 26 side and a small-diameter portion 46B provided at a radially central portion of the main-body portion 46A integrally with the main-body portion 46A. A distal portion of the small-diameter portion 46B is embedded and secured in a lower portion of a radially central portion of the support base 26. The outside diameter of the main-body portion 46A is made smaller by a predetermined dimension than the inside diameter of the small cylindrical portion 20A, and an annular gap 48 is formed between the small cylindrical portion 20A and the resilient member 24. In addition, a resilient member 50 is vulcanized to the bottom surface of the main-body portion 46A.

Between the outer case 12 and the inner cylinder 20, a limiting-passageway constituting member 52 is disposed in the vicinity of the upper portion of the small cylindrical portion 20A. As shown in FIG. 2, the limiting-passageway constituting member 52 is formed in the shape of a ring, and, as shown in FIG. 1, the inner peripheral surface of the limiting-passageway constituting member 52 is in close contact with the outer peripheral surface of the small cylindrical portion 20A, while the outer peripheral surface of the limiting-passageway constituting member 52 is in close contact with the inner peripheral surface of the cylindrical portion 14. The space surrounded by the outer case 12, the small cylindrical portion 20A, and the limiting-passageway constituting member 52 is formed as an auxiliary liquid chamber 44, and a liquid such as ethylene glycol is filled therein.

As shown in FIG. 2, a groove 54 having a substantially C-shaped configuration as viewed in the axial direction is formed in the outer periphery of the limiting-passageway constituting member 52. As shown in FIG. 1, the groove 54 is surrounded by the cylindrical portion 14 of the outer case 12 and constitutes a limiting passageway 56.

A through hole 58 extending radially through the limiting-passageway constituting member 52 at a longitudinal end of the groove 54 is formed in the limiting-passageway constituting member 52, while a rectangular hole 60 is formed at the other longitudinal end of the groove 54 on the lower side thereof. Meanwhile, a hole 62 having a larger diameter than the through hole 58 is formed in the small cylindrical portion 20A of the inner cylinder 20 at a position of the limiting-passageway constituting member 52 facing the through hole 58. As a result, the main liquid chamber 42 and the auxiliary liquid chamber 44 are always made to communicate with each other via the hole 62, the through hole 58, the limiting passageway 56, and the rectangular hole 60.

As shown in FIGS. 1 and 3, a plurality of rectangular holes 64 are provided in the cylindrical portion 14 of the outer case 12 at a position lower than the limiting-passageway constituting member 52. These rectangular holes 64 are closed by diaphragms 66, respectively. Peripheral edges of each of the diaphragms 66 are vulcanized to the inner peripheral portion of the rectangular hole 64, and each of the diaphragms 66 is arranged in such a manner as to be convex toward the auxiliary liquid chamber 44.

Meanwhile, a solenoid 70 serving as an electromagnetically driving means is disposed in a recessed portion 68 of the bottom plate 16 below the diaphragm 38. The solenoid 70 is comprised of a coil 70C serving as a magnetic-field generating means and a drive shaft 70A serving as a plunger. The drive shaft 70A of this solenoid 70 is secured to the radially central portion of the diaphragm 38. A compression coil spring 78 for urging the diaphragm 38 in a direction away from the solenoid 70 is disposed between a main body 70B of the solenoid 70 and the diaphragm 38. When the diaphragm 38 moves toward the solenoid 70, the compression coil spring 78 is brought into close contact with the diaphragm 38, thereby limiting the amount of movement of the diaphragm 38 toward the solenoid 70.

The coil 70C of the solenoid 70 is connected to a controller 80 by means of an unillustrated conductive wire. In addition, a pressure sensor 82 is disposed inside the main liquid chamber 42, and the pressure sensor 82 is connected to the controller 80 by means of an unillustrated conductive wire.

The controller 80 is capable of detecting the internal pressure of the main liquid chamber 42 by means of the pressure sensor 82, and controls the current which flows across the coil 70C of the solenoid 70 on the basis of the pressure detection signal of the pressure sensor 82. In this embodiment, the drive shaft 70A of the solenoid 70 moves the diaphragm 38 in the direction in which the diaphragm 38 is attracted toward the solenoid 70 (in the opposite direction to the direction of arrow A) when the current flows across the coil 70C.

A static spring constant $Ks2$ at a time when the diaphragm 38 is displaced in the axial direction (in the direction of arrow A and in the opposite direction thereto) is preferably not more than 5 times a static spring constant $Ks1$ persisting when the support base 26 is displaced in the axial direction. As a result, the attracting force produced by the solenoid 70 can be made small, so that the solenoid 70 of a compact type can be used.

With regard to the relationship between, on the one hand, the effective diameter $D1$ (the effective diameter $D1$ referred to herein is a value obtained by dividing the volume V of the liquid in the main liquid chamber 42 displaced when the support base 26 moves in the axial direction by the distance $X1$ of axial movement of the support base 26) of the movable portions (i.e., the support base 26 and the resilient member 24) at a time when the support base 26 moves in the axial direction and, on the other hand, the effective diameter $d1$ (the effective diameter di referred to herein is a value obtained by dividing the volume V of the liquid in the main liquid chamber 42 displaced when the support base 26 moves in the axial direction by the distance $X2$ of axial movement of the diaphragm 38) of the movable portions (i.e., the diaphragm 38 and the resiliently supporting member 40) at a time when the diaphragm 38 moves in the axial direction, the effective diameter $d1$ of the movable portions should preferably be made large within a permissible range. Namely, by making the effective diameter $d1$ on the diaphragm 38 side larger than the effective diameter $D1$ on the support base 26 side, the axial displacement $X2$ of the diaphragm 38 can be made smaller than the axial displacement $X1$ of the support base 26. In other words, by making the moving distance of the diaphragm 38 short, it is possible to improve the response characteristic at a time when the diaphragm 38 is moved by the solenoid 70.

Next, a description will be given of the operation of this embodiment.

In the vibration isolator 10 of this embodiment, the outer case 12 is secured to, for instance, the chassis of an unillustrated automobile via the mounting bolt 18, and the engine is mounted on the support base 26 and is secured thereto by means of the mounting bolt 28.

When the vibrations of the engine are transmitted to the vibration isolator 10, the vibrations are supported by the chassis via the support base 26, the resilient member 24, the outer case 12, and the inner cylinder 20, and the vibrations are absorbed by the resistance based on the internal friction of the resilient member 24.

For instance, when vibrations with low frequencies and large amplitude, such as idling vibrations (with frequencies ranging from 15 to 30 Hz), are transmitted to the vibration isolator 10, the hydraulic pressure within the main liquid chamber 42 changes due to the vibrations. As a result, the auxiliary liquid chamber 44 undergoes a pressure change via the limiting passageway 56, and the diaphragms 66 are consequently deformed. Here, as the liquid in an amount corresponding to the amplitude flows back and forth through the limiting passageway 56, a large attenuating force is produced, thereby absorbing the idling vibrations. At this time, the diaphragm 38 is subjected to the change in the hydraulic pressure and is displaced in the axial direction, but since the amount of displacement is restricted by the abutment portion 34 of the stopper 30 and the pressing force of the compression coil spring 78, the reduction in the amount of the liquid flowing back and forth through the limiting passageway 56 owing to the movement of the diaphragm 38 is small. Consequently, the decline in the attenuating force due to the reduction in the amount of the liquid flowing back and forth through the limiting passageway 56 becomes a value which can be virtually ignored.

On the other hand, when vibrations with high frequencies and small amplitude, such as high-frequency vibrations (with frequencies ranging from several tens to several hundreds of Hz) which can produce humming sounds, are transmitted to the vibration isolator 10, the limiting passageway 56 becomes clogged. At this time, the solenoid 70 is actuated on the basis of the pressure detection signal of the pressure sensor 82, which in turn causes the diaphragm 38 to vibrate so as to suppress the pressure change in the main liquid chamber 42, thereby making it possible to control an increase in the dynamic spring constant.

For instance, when the support base 26 moves downward to cause the internal pressure of the main liquid chamber 42 to rise, the controller 80 increases the current flowing across the coil 70C of the solenoid 70, so as to attract the diaphragm 38 toward the solenoid 70. As a result, the rise in the hydraulic pressure in the main liquid chamber 42 can be suppressed.

Meanwhile, when the resilient member 24 moves upward to cause the internal pressure of the main liquid chamber 42 to drop, the controller 80 reduces the current flowing across the coil 70C of the solenoid 70 to set it to zero, so as to allow the diaphragm 38 to move in the direction away from the solenoid 70 by the urging force of the compression coil spring 78. As a result, the drop in the hydraulic pressure in the main liquid chamber 42 can be suppressed.

Furthermore, as the frequency of the vibration becomes high, the liquid resonates (flows back and forth in the directions of double-headed arrow B) in the gap 33 between the main-body portion 46A of the umbrella orifice member 46 and the resilient member 24, thereby making it possible to suppress the rise in the dynamic spring constant of the vibration isolator 10.

In this embodiment, since the diaphragm 38 is urged by the urging force of the compression coil spring 78, the diaphragm 38 can be moved with a force greater than the resiliency of the resilient supporting member 40 alone. Hence, the response characteristic at a time when the diaphragm 38 moves in the direction away from the solenoid 70 is excellent, and the diaphragm 38 can be vibrated efficiently, with the result that a stable vibration isolating characteristic can be obtained.

Furthermore, in this embodiment, since the diaphragm 38 is urged by the urging force of the compression coil spring 78, the effect of the change over time of the resilient supporting member 40 is small, so that the stable vibration isolating characteristic can be maintained over extended periods of time.

Figure 4:
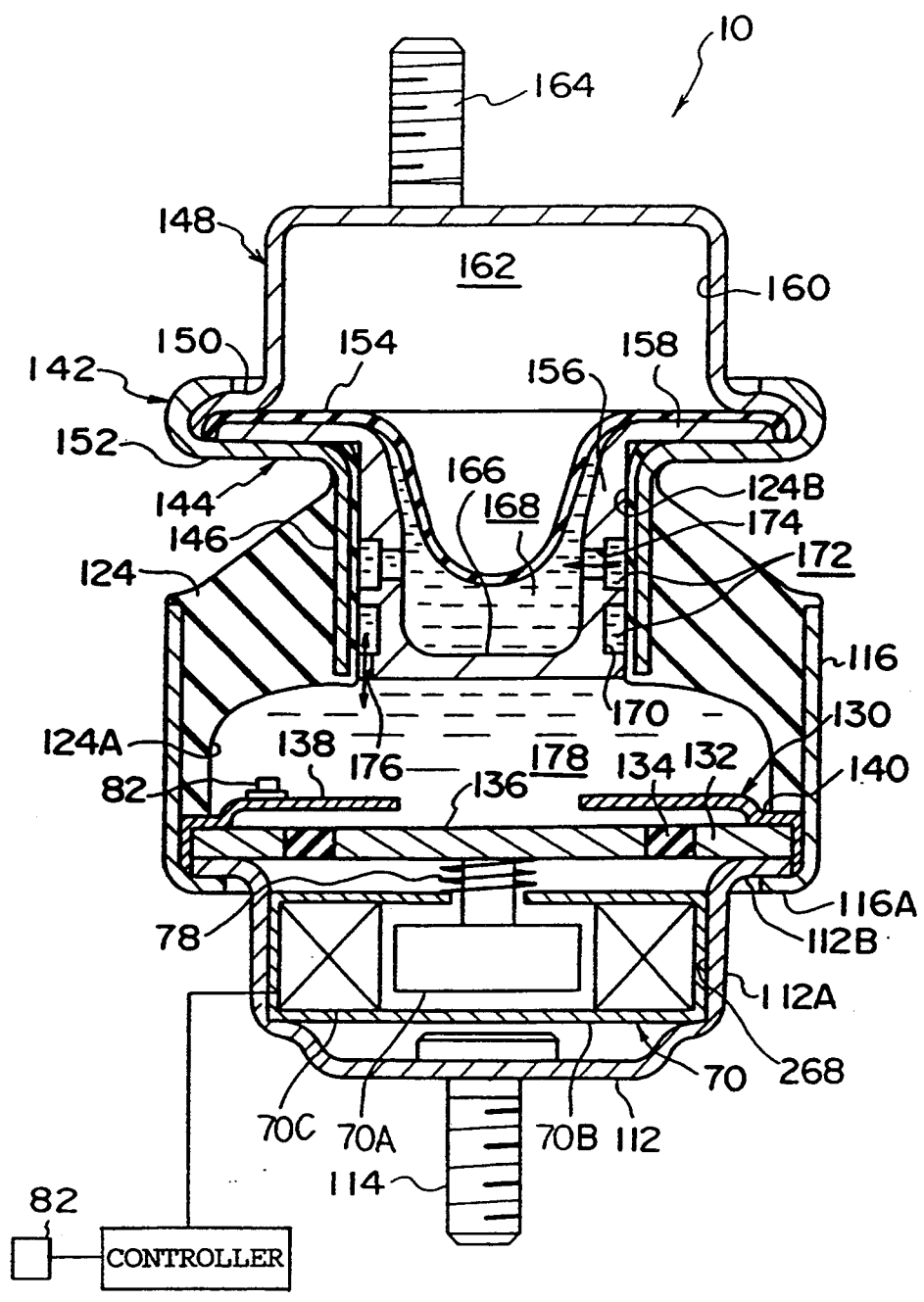
FIG. 4 is a cross-sectional view of a vibration isolator in accordance with a second embodiment of the present invention as taken along an axis thereof.
Figure 5:
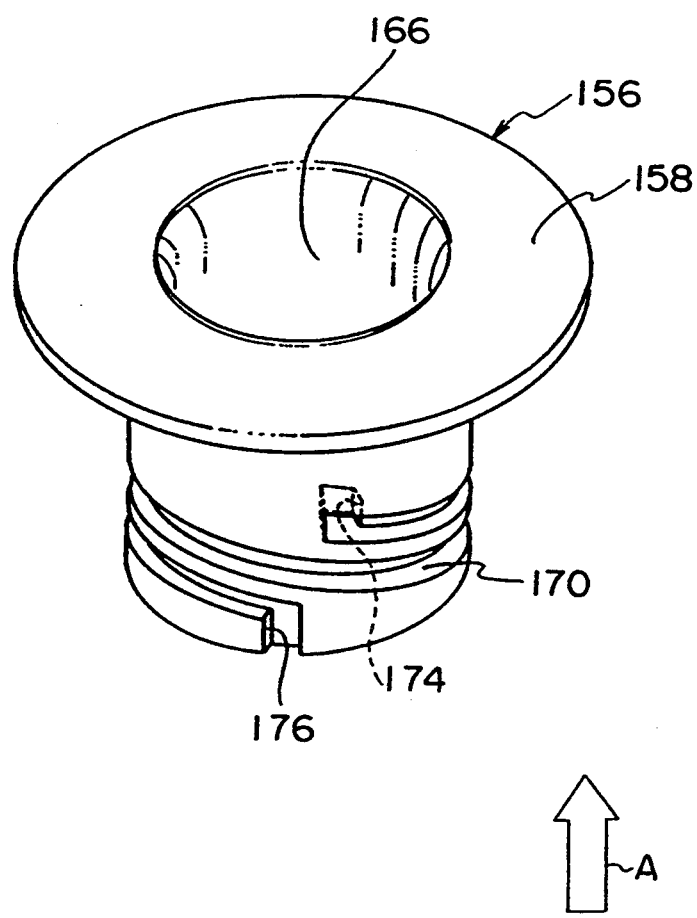
FIG. 5 is a perspective view illustrating a limiting-passageway constituting member of the vibration isolator in accordance with the second embodiment of the present invention.

Referring now to FIGS. 4 and 5, a description will be given of a second embodiment of the present invention. In this embodiment, the same components and portions as those of the first embodiment will be denoted by the same reference numerals, and a description thereof will be omitted.

As shown in FIG. 4, this vibration isolator 10 is provided with a bottom plate 112 serving as the first mounting member. A mounting bolt 114 is disposed at the radially central portion of this bottom plate 112 in such a manner as to project downwardly therefrom. An upright wall portion 112A bent axially upwardly is formed around the outer periphery of the bottom plate 112. A flange 112B extending radially outwardly is formed continuously at the upper end of the upright wall portion 112A.

An outer cylinder 116 is disposed above the bottom plate 112. The outer periphery of a resilient member 124 is vulcanized to the inner periphery of the outer cylinder 116. A recess 124A is formed in a lower portion of a radially central portion of the resilient member 124.

A lower end portion 116A of the outer cylinder 116 is formed by being drawn radially inwardly, and a stopper 130, a diaphragm-supporting plate 132, and the flange 112B are disposed between this lower end portion 116A and the lower end of the resilient member 124.

The diaphragm-supporting plate 132 is formed of a plate material of a large thickness into an annular shape, and an annular resiliently supporting member 134 is made to adhere to the inner periphery of the diaphragm-supporting plate 132. The outer periphery of a diaphragm (vibrating element) 136 formed in the shape of a disk is made to adhere to the inner periphery of this resiliently supporting member 134.

The stopper 130 is formed of a plate material of a small thickness into an annular shape, and an abutment portion 138 is disposed with a gap of a predetermined dimension between the same and the diaphragm 136. A stepped portion 140 is provided in an outer peripheral portion of the abutment portion 138. This stepped portion 140 together with the diaphragm-supporting plate 132 is clamped by the lower end of the resilient member 124 and the flange 112B of the bottom plate 112. In addition, the outer periphery of the stepped portion 140 is bent downwardly, and is clamped by the inner periphery of the outer cylinder 116 and the outer peripheries of the diaphragm-supporting plate 132 and the flange 112B. It should be noted that the inside diameter of the abutment portion 138 of the stopper 130 is set to be smaller than the outside diameter of the diaphragm 136.

The solenoid 70 similar to that of the first embodiment is disposed below the diaphragm 138 and in a recessed portion 168 of the bottom plate 112. The compression coil spring 78 is disposed between the solenoid 70 and the diaphragm 136.

Meanwhile, a support base 142 serving as the second mounting member is disposed in the radially central portion of the resilient member 124. This support base 142 is comprised of a fixing member 144 and an air-chamber forming member 148.

The fixing member 144 has a flange 152 at an upper end of a cylindrical portion 146, and the resilient member 124 is vulcanized to the cylindrical portion 146.

The air-chamber forming member 148 has an axial cross section formed substantially in the shape of a hat, and a flange 150 of this air-chamber forming member 148 is secured to the flange 152 of the fixing member 144 as the flange 152 is caulked.

A diaphragm 154 is disposed between the fixing member 144 and the air-chamber forming member 148. A limiting-passageway constituting member 156 is disposed below the diaphragm 154 and on the radially inward side of the cylindrical portion 146 of the fixing member 144.

The limiting-passageway constituting member 156 has a substantially cylindrical shape, and has a flange 158 at an upper end thereof. This flange 158 together with the diaphragm 154 is clamped and secured by the flange 152 of the fixing member 144 and the flange 150 of the air-chamber forming member 148.

An air chamber 162 is provided between a recess 160 in the air-chamber forming member 148 and the diaphragm 154, and may be made to communicate with the atmospheric air, as necessary. A mounting bolt 164 is disposed in the vicinity of an axial portion of the outer surface of the air-chamber forming member 148 in a projecting manner.

The limiting-passageway constituting member 156 has a radially outer peripheral portion in close contact with the cylindrical portion 146 of the fixing member 144 via a thin-walled portion 124B extending from a portion of the resilient member 142. In addition, a recess is formed in the limiting-passageway constituting member 156 on the radially inward side thereof, and an auxiliary liquid chamber 168 is provided between the recess 166 and the diaphragm 154.

As shown in FIG. 5, a helical groove 170 is formed in an outer periphery of the limiting-passageway constituting member 156, and this helical groove 170 is formed with approximately two rounds about the axis in the outer periphery of the limiting-passageway constituting member 156. As shown in FIG. 4, the helical groove 170 is surrounded by an inner wall surface of the cylindrical portion 146 of the fixing member 144 and constitutes a limiting passageway 172.

The space surrounded by the limiting-passageway constituting member 156, the resilient member 124, the diaphragm 136, the resiliently supporting member 134, and the diaphragm-supporting plate 132 is formed as a pressure-receiving liquid chamber (main liquid chamber) 178.

The limiting passageway 172 has one longitudinal end communicating with the auxiliary liquid chamber 168 via a through hole 174 and the other longitudinal end communicating with the main liquid chamber 178 via a communicating groove 176. A liquid such as ethylene glycol is filled in the main liquid chamber 178, the auxiliary liquid chamber 168, and the limiting passageway 172.

Next, a description will be given of the operation of this embodiment.

In the vibration isolator 10 of this embodiment, the bottom plate 112 is secured to, for instance, the chassis of an unillustrated automobile via the mounting bolt 114, and the engine is mounted on the support base 142 and is secured thereto by means of the mounting bolt 164.

When idling vibrations with large amplitude are transmitted to the vibration isolator 10, the diaphragm 154 is deformed by a change in the hydraulic pressure, and a large amount of the liquid passes back and forth between the main liquid chamber 178 and the auxiliary liquid chamber 168 via the limiting passageway 172. As a result, a large attenuating force is produced, thereby absorbing the idling vibrations. Although the diaphragm 136 is subjected to the hydraulic pressure and is displaced, since the amount of displacement is restricted by the stopper 130 and the compression coil spring 78, the reduction in the amount of the liquid flowing back and forth through the limiting passageway 172 owing to the movement of the diaphragms 136 is small. Consequently, the decline in the attenuating force due to the reduction in the amount of the liquid flowing back and forth through the limiting passageway 172 becomes a value which can be virtually ignored.

On the other hand, when high-frequency vibrations (with frequencies ranging from several tens to several hundreds of Hz) are transmitted to the vibration isolator 10, the limiting passageway 172 becomes clogged. At this time, the solenoid 70 is actuated on the basis of the pressure detection signal of the pressure sensor 82, which in turn causes the diaphragm 136 to be displaced in the direction of suppressing the pressure change in the main liquid chamber 42 in the same way as in the first embodiment, thereby making it possible to control an increase in the dynamic spring constant.

In this embodiment as well, since the diaphragm 136 is urged by the urging force of the compression coil spring 78 in the same way as in the first embodiment, the diaphragm 136 can be moved with a force greater than the resiliency of the resiliently supporting member 134 alone. Hence, the response characteristic at a time when the diaphragm 136 moves in the direction away from the solenoid 70 is excellent, and the diaphragm 136 can be vibrated efficiently, with the result that a stable vibration isolating characteristic can be obtained. In addition, since the diaphragm 136 is urged by the urging force of the compression coil spring 78, the effect of the change over time of the resiliently supporting member 134 is small, so that the stable vibration isolating characteristic can be maintained over extended periods of time.

Figure 6:
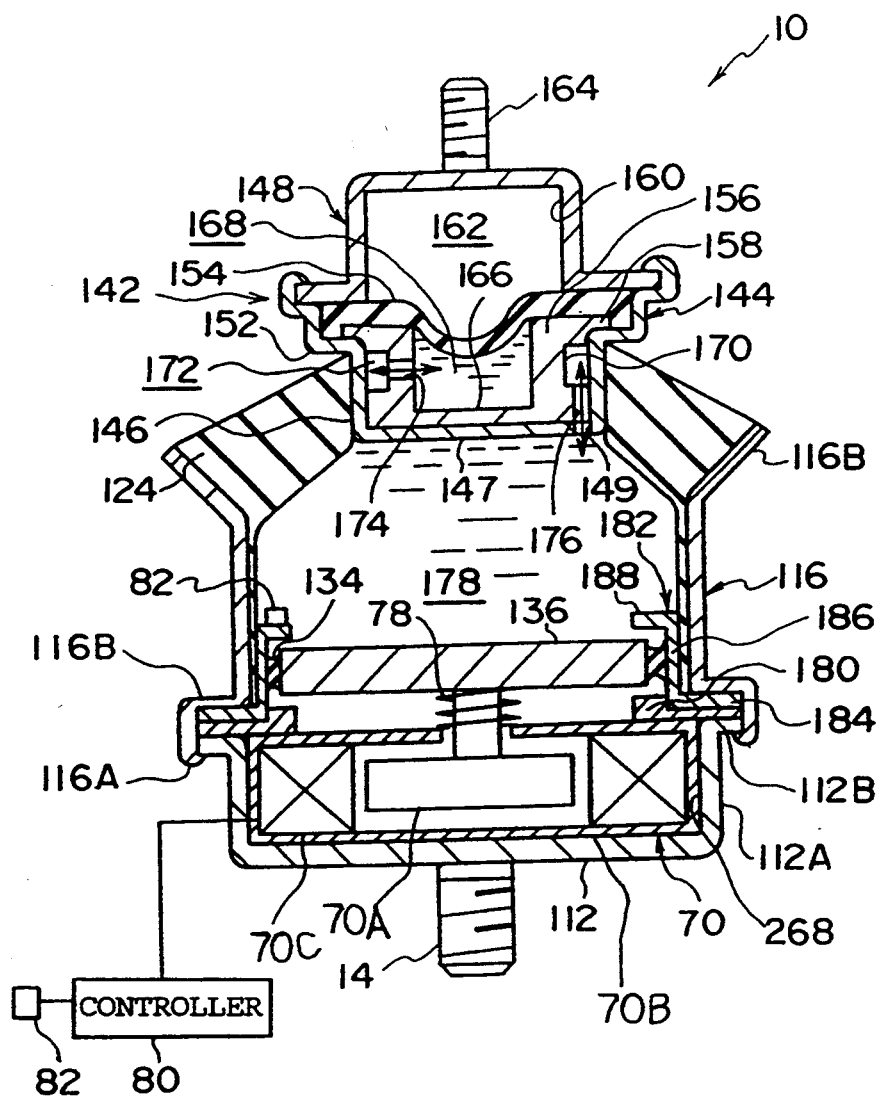
FIG. 6 is a cross-sectional view of a vibration isolator in accordance with a third embodiment of the present invention as taken along an axis thereof.
Figure 6:

Referring now to FIG. 6, a description will be given of a third embodiment of the present invention. It should be noted that this embodiment is an modification of the vibration isolator 10 of the second embodiment, so that the same components and portions as those of the second embodiment will be denoted by the same reference numerals, and a description thereof will be omitted.

As shown in FIG. 6, in this vibration isolator 10, an upper end portion of the outer cylinder 116 is formed as a flared portion 116B whose diameter is gradually enlarged. The outer periphery of a resilient member 124 is vulcanized to the inner periphery of the flared portion 116B.

The lower end portion 116A of the outer cylinder 116 is drawn radially inwardly, and a lower stopper 180 formed annularly and serving as an amount-of-movement restricting member and a fixed portion 184 of a diaphragm-supporting plate 182 serving as another amount-of-movement restricting member are clamped by the flange 116B of the outer cylinder 116 and the flange 112B of the bottom plate 112.

The diaphragm-supporting plate 182 is formed of a plate material of a small thickness into an annular shape, and the annular resiliently supporting member 134 is made to adhere to the inner periphery of a cylindrical portion 186 provided in the diaphragm-supporting plate 182. The outer periphery of the diaphragm 136 formed in the shape of a disk is made to adhere to the inner periphery of this resiliently supporting member 134.

An annular abutment member 188 bent radially inwardly is disposed above the cylindrical portion 186 of the diaphragm-supporting plate 182. The inside diameter of the abutment portion 188 and the inside diameter of the lower stopper 180 are set to be smaller than the outside diameter of the diaphragm 136 by a predetermined dimension.

The solenoid 70 is disposed in the recessed portion 168 of the bottom plate 112 in the same way as in the second embodiment.

Meanwhile, the support base 142 is provided with a bottom plate 147 formed integrally with the cylindrical portion 146. The bottom plate 147 is provided with a through hole 149 at a position facing the communicating groove 176 in the limiting-passageway constituting member 156. It should be noted that the helical groove 170 in this embodiment is formed with slightly less than one round around the axis in the outer periphery of the limiting-passageway constituting member 156.

The operation of this embodiment will be described hereafter.

In the vibration isolator 10 of this embodiment as well, in the same way as the vibration isolator 10 of the second embodiment, when idling vibrations with large amplitude are transmitted thereto, the diaphragm 156 is deformed owing to a change in the hydraulic pressure, and a large amount of the liquid passes back and forth between the main liquid chamber 178 and the auxiliary liquid chamber 168 via the limiting passageway 172. As a result, a large attenuating force is produced, thereby absorbing the idling vibrations. Although the diaphragm 136 is subjected to the hydraulic pressure and is displaced, since the amount of displacement is restricted by the lower stopper 180 and the abutment portion 188, the reduction in the amount of the liquid flowing back and forth through the limiting passageway 172 owing to the movement of the diaphragm 136 is small. Consequently, the decline in the attenuating force due to the reduction in the amount of the liquid flowing back and forth through the limiting passageway 172 becomes a value which can be virtually ignored.

On the other hand, when high-frequency vibrations (with frequencies ranging from several tens to several hundreds of Hz) are transmitted to the vibration isolator 10, the limiting passageway 172 becomes clogged. At this time, the solenoid 70 is actuated on the basis of the pressure detection signal of the pressure sensor 82, which in turn causes the diaphragm 136 to be displaced in the direction of suppressing the pressure change in the main liquid chamber 178 in the same way as in the second embodiment, thereby making it possible to control an increase in the dynamic spring constant.

In this embodiment as well, since the diaphragm 136 is urged by the urging force of the compression coil spring 78 in the same way as in the second embodiment, the diaphragm 136 can be moved with a force greater than the resiliency of the resiliently supporting member 134 alone. Hence, the response characteristic at a time when the diaphragm 136 moves in the direction away from the solenoid 70 is excellent, and the diaphragm 136 can be vibrated efficiently, with the result that a stable vibration isolating characteristic can be obtained. In addition, since the diaphragm 136 is urged by the urging force of the compression coil spring 78, the effect of the change over time of the resiliently supporting member 134 is small, so that the stable vibration isolating characteristic can be maintained over extended periods of time.

Although, in the first to third embodiments, the solenoid 70 is controlled by detecting a change in the internal pressure of the main liquid chamber 42 or 178, the present invention is not limited to the same. For instance, an arrangement may be alternatively provided such that a vibration-detecting sensor is provided on the engine, i.e., a vibration-generating portion, a vibration-detecting sensor is provided on the chassis, i.e., a vibration-receiving portion, and these sensors are connected to the controller, so as to control the solenoid 70 in such a manner that the vibrations of the chassis become minimum.

In addition, although, in the first to third embodiments, the drive shaft 70A is moved in the direction in which the diaphragm 38 or 136 is attracted toward the solenoid 70 when the current flows across the solenoid 70, the present invention is not limited to the same. For instance, it goes without saying that the drive shaft 70A may be moved in the direction in which the diaphragm 38 or 136 is moved in the direction away from the solenoid 70 when the current flows across the solenoid 70. In this case, it suffices if the diaphragm 38 or 136 and the solenoid 70 are coupled together by means of a tensile coil spring to urge the diaphragm 38 or 136 toward the solenoid 70.

Furthermore, although an example in which the liquid-sealed type vibration isolator is used as an engine mount is shown in the embodiments, the present invention is not limited to the same, and it goes without saying that the liquid-sealed type vibration isolator may be used in a body mount, a general industrial machine, or the like.

What is claimed is:

1. A liquid-sealed type vibration isolator comprising:
   a first mounting member connected to one of a vibration-generating portion and a vibration-receiving portion;
   a second mounting member connected to the other one of said vibration-generating portion and said vibration-receiving portion;
   a resilient member disposed between said first mounting member and said second mounting member and adapted to undergo deformation during occurrence of vibrations;
   a pressure-receiving liquid chamber disposed in such a manner as to be capable of expanding and contracting by using said resilient member as a portion of a partition wall of said pressure-receiving liquid chamber;
   an auxiliary liquid chamber disposed in spaced-apart relation with said pressure-receiving chamber and having at least one diaphragm that is subjected to the hydraulic pressure of said auxiliary liquid chamber;

a limiting passageway allowing said pressure-receiving liquid chamber and said auxiliary liquid chamber to communicate with each other;

a vibrating element supported by one of said first mounting member and said second mounting member via a resilient supporting member in such a manner as to be movable along a predetermined axis, said vibrating element constituting a portion of another partition wall of said pressure-receiving liquid chamber so as to be subjected to the hydraulic pressure of said pressure-receiving liquid chamber;

electromagnetic driving means for moving said vibrating element in one of two predetermined directions along said predetermined axis, said electromagnetic driving means having a magnetic-field generating means for generating a magnetic field and a movable member adapted to be moved in one of the two predetermined directions by being subjected to the magnetic field generated by said magnetic-field generating means; and a spring independent from said vibrating element and pressure within said pressure-receiving liquid chamber for urging said vibrating element in the other one of the two predetermined directions.

2. A liquid-sealed type vibration isolator according to claim 1, wherein said electromagnetic driving means is a solenoid, said movable member is a plunger, and said magnetic-field generating means is a coil.

3. A liquid-sealed type vibration isolator according to claim 1, further comprising:

vibrating-element movement limiting means for limiting an amount of movement of said vibrating element in at least one of the two predetermined directions.

4. A liquid-sealed type vibration isolator according to claim 3, wherein said vibrating-element movement limiting means has an abutment member disposed on at least one of axial opposite ends of said vibrating-element movement limiting means and projecting therefrom radially inwardly of an outer periphery of said vibrating element.

5. A liquid-sealed type vibration isolator according to claim 1, further comprising:

controlling means for controlling said electromagnetic driving means to move said vibrating element in one of the two predetermined directions for allowing a change in the internal pressure of said pressure-receiving liquid chamber to be offset.

6. A liquid-sealed type vibration isolator according to claim 5, wherein said controlling means has a pressure sensor disposed in said pressure-receiving liquid chamber to detect a change in the internal pressure of said pressure-receiving liquid chamber, and said controlling means controls said electromagnetic driving means on the basis of data on the change in the internal pressure of said pressure-receiving liquid chamber detected by said pressure sensor.

7. A liquid-sealed type vibration isolator according to claim 5, wherein said controlling means has a plurality of vibration-detecting sensors disposed in the vibration-generating portion and the vibration-receiving portion to detect vibrations in the vibration-generating portion and the vibration-receiving portion, and said controlling means controls said electromagnetic driving means on the basis of data on the vibrations in said vibration-generating portion and the vibration-receiving portion detected by said plurality of vibration-detecting sensors.

8. A liquid-sealed type vibration isolator according to claim 1, wherein said second mounting member is disposed on a radially inward side of an outer periphery of said first mounting member in such a manner that an amount of movement of said second mounting member during occurrence of vibrations becomes larger than an amount of movement of said vibrating element.

9. A liquid-sealed type vibration isolator according to claim 1, wherein said second mounting member is disposed on a radially inward side of an outer periphery of said first mounting member, and a static spring constant of said second mounting member is set such that a static spring constant of said vibrating element becomes not more than five times the static spring constant of said second mounting member.

10. A liquid-sealed type vibration isolator according to claim 1, wherein said resilient supporting member is disposed on an outer periphery of said vibrating element.

11. A liquid-sealed type vibration isolator comprising:
a first mounting member connected to one of a vibration-generating portion and a vibration-receiving portion;

a second mounting member connected to the other one of said vibration-generating portion and said vibration-receiving portion;

a resilient member disposed between said first mounting member and said second mounting member and adapted to undergo deformation during occurrence of vibrations;

a pressure-receiving liquid chamber disposed in such a manner as to be capable of expanding and contracting by using said resilient member as a portion of a partition wall of said pressure-receiving liquid chamber;

an auxiliary liquid chamber disposed in spaced-apart relation with said pressure-receiving chamber and having at least one diaphragm that is subjected to the hydraulic pressure of the auxiliary liquid chamber;

a limiting passageway allowing said pressure-receiving liquid chamber and said auxiliary liquid chamber to communicate with each other;

a vibrating plate supported by one of said first mounting member and said second mounting member via a resilient supporting member in such a manner as to be movable along an axis, said vibrating plate constituting a portion of another partition wall of said pressure-receiving liquid chamber so as to be subjected to the hydraulic pressure of said pressure-receiving liquid chamber;

a solenoid disposed on a side of said vibrating plate away from said pressure-receiving liquid chamber to move said vibrating plate in one of two predetermined directions along said axis, said solenoid including a coil for generating a magnetic field and a plunger adapted to be moved by being subjected to the magnetic field generated by said coil;

a spring for urging said vibrating plate in the other one of the two predetermined directions;

vibrating plate movement limiting means for limiting an amount of movement of said vibrating plate in at least one of the two predetermined directions; and solenoid controlling means for controlling said solenoid to move said vibrating plate along said axis in one of the two predetermined directions for allowing a change in the internal pressure of said pressure-receiving liquid chamber to be offset.

12. A liquid-sealed type vibration isolator according to claim 11, wherein a compression coil spring is used as said spring.

13. A liquid-sealed type vibration isolator according to claim 11, wherein a tensile coil spring is used as said spring.

14. A liquid-sealed type vibration isolator according to claim 11, wherein said vibrating plate movement limiting means has an abutment member disposed on at least one of opposite axial ends of said vibrating plate movement limiting means and projecting therefrom radially inwardly of an outer periphery of said vibrating plate.

15. A liquid-sealed type vibration isolator according to claim 11, wherein said solenoid controlling means has a pressure sensor disposed in said pressure-receiving liquid chamber to detect a change in the internal pressure of said pressure-receiving liquid chamber, and said solenoid controlling means controls said solenoid on the basis of data on the change in the internal pressure of said pressure-receiving liquid chamber detected by said pressure sensor.

16. A liquid-sealed type vibration isolator according to claim 11, wherein said solenoid controlling means has a plurality of vibration-detecting sensors disposed in the vibration-generating portion and the vibration-receiving portion to detect vibrations in the vibration-generating portion and the vibration-receiving portion, and said solenoid controlling means controls said solenoid on the basis of data on the vibrations in said vibration-generating portion and the vibration-receiving portion detected by said plurality of vibration-detecting sensors.

17. A liquid-sealed type vibration isolator according to claim 11, wherein said second mounting member is disposed on radially inward side of an outer periphery of said first mounting member in such a manner that an amount of movement of said second mounting member during occurrence of vibrations becomes larger than an amount of movement of said vibrating plate.

18. A liquid-sealed type vibration isolator according to claim 11, wherein said second mounting member is disposed on the radially inward side of an outer periphery of said first mounting member, and a static spring constant of said second mounting member is set such that a static spring constant of said vibrating plate becomes more than five times the static spring constant of said second mounting member.

19. A liquid-sealed type vibration isolate according to claim 11, wherein said vibrating plate is fixed to one end of said plunger.

20. A liquid-sealed type vibration isolator comprising:

a first mounting member connected to one of a vibration-generating portion and a vibration-receiving portion;

a second mounting member connected to the other one of said vibration-generating portion and said vibration-receiving portion;

a resilient member disposed between said first mounting member and said second mounting member and adapted to undergo deformation during occurrence of vibrations;

a pressure-receiving liquid chamber disposed in such a manner as to be capable of expanding and contracting by using said resilient member as a portion of a partition wall of said pressure-receiving liquid chamber;

an auxiliary liquid chamber disposed in spaced-apart relation with said pressure-receiving chamber and having at least one diaphragm that is subjected to the hydraulic pressure of the auxiliary liquid chamber;

a limiting passageway for allowing a change in hydraulic pressure in said pressure-receiving liquid chamber to be communicated to said auxiliary liquid chamber when low frequency vibrations are applied to the vibration isolator and for preventing a change in hydraulic pressure in said pressure receiving liquid chamber from being communicated to said auxiliary liquid chamber when high frequency vibrations are applied to the vibration isolator;

a vibrating element supported by one of said first mounting member and said second mounting member via a resilient supporting member in such a manner as to be movable along a predetermined axis, said vibrating element constituting a portion of another partition wall of said pressure-receiving liquid chamber so as to be subjected to the hydraulic pressure of said pressure-receiving liquid chamber;

electromagnetic driving means for moving said vibrating element in one of two predetermined directions along said predetermined axis, said electromagnetic driving means having a magnetic-field generating means for generating a magnetic field and a movable member adapted to be moved in one of the two predetermined directions by being subjected to the magnetic field generated by said magnetic-field generating means; and urging means located between said vibrating element and said electromagnetic driving means for urging said vibrating element in the other one of the two predetermined directions.

* * * * *